United States Patent [19]

Seng

[11] Patent Number: 4,592,723
[45] Date of Patent: * Jun. 3, 1986

[54] PROCESS FOR REUSING SCRAP GLASS

[75] Inventor: Stephen Seng, Bladensburg, Ohio

[73] Assignee: Owens-Corning Fiberglas Corporation, Toledo, Ohio

[*] Notice: The portion of the term of this patent subsequent to Dec. 27, 2000 has been disclaimed.

[21] Appl. No.: 685,630

[22] Filed: Dec. 24, 1984

[51] Int. Cl.⁴ .................. F27B 14/00; F27B 7/02
[52] U.S. Cl. .................. 432/13; 432/215; 432/28; 65/27; 165/111
[58] Field of Search .......... 432/13, 27, 28, 210, 432/211, 215, 105, 109, 111; 165/111; 65/27

[56] References Cited

U.S. PATENT DOCUMENTS

| 2,571,342 | 10/1951 | Crowley, Jr. | 432/215 |
| 2,592,783 | 4/1952 | Aspegren | 165/111 |
| 2,597,585 | 5/1952 | Howard | 432/13 |
| 2,872,386 | 2/1959 | Aspegren | 432/215 |
| 3,244,494 | 4/1966 | Appel et al. | 432/13 |
| 4,207,943 | 6/1980 | Gardner | 165/1 |
| 4,319,903 | 3/1982 | Hohman | 65/27 |
| 4,338,113 | 7/1982 | Hohman et al. | 165/111 |
| 4,421,629 | 12/1983 | York et al. | 208/8 R |
| 4,422,847 | 12/1983 | Propster et al. | 432/28 |
| 4,474,553 | 10/1984 | Takahashi | 432/215 |

Primary Examiner—Henry C. Yuen
Attorney, Agent, or Firm—Ronald C. Hudgens; Patrick P. Pacella

[57] ABSTRACT

A method of removing coatings from scrap glass is disclosed. The scrap glass is milled in the presence of particulate batch, preheated and fed to a glass melting furnace. The particulate batch aids in the milling of the scrap glass. The process removes the coatings from the scrap during preheating and provides clean material for melting.

8 Claims, 1 Drawing Figure

U.S. Patent  Jun. 3, 1986  4,592,723
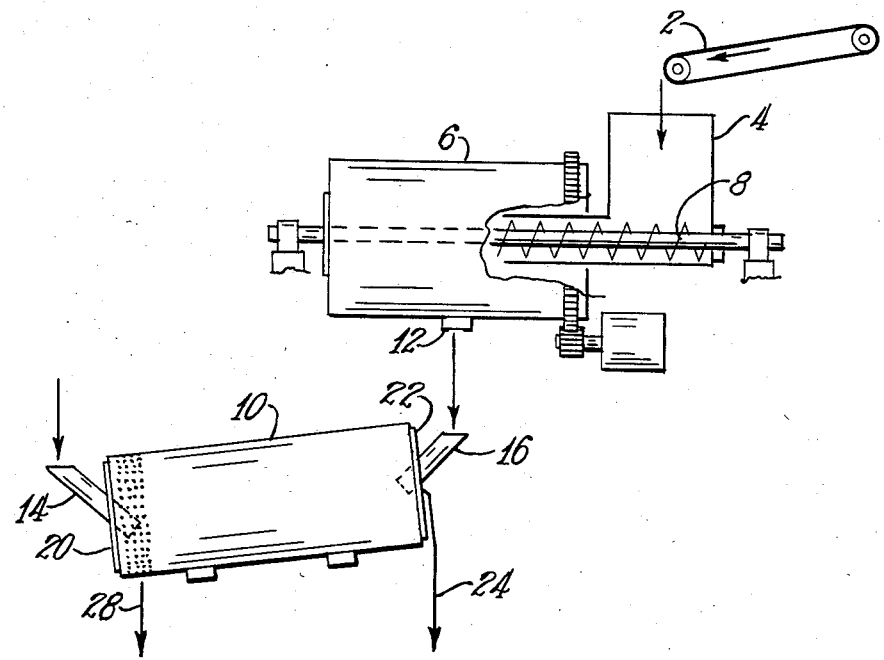

PROCESS FOR REUSING SCRAP GLASS

TECHNICAL FIELD

This invention relates to a method of removing coatings from glass fibers. In one embodiment, the cleaned scrap glass is fed to a glass melting furnace.

BACKGROUND ART

Before remelting scrap glass, organic binders and sizes on the surface of the glass must be removed. If this is not done, the glass will enclose the remaining binder in the form of carbon. Upon remelting, carbon will reduce the glass. This reduced darkened glass is undesirable for both glass composition and melting.

One method of doing this is to mill the scrap glass and blend it with granular raw batch before charging the batch to the furnace. It is important to ensure that oxidizing conditions are maintained in the glass melt within the furnace so that the glass furnace may feed a fiberizing process without harmful effects.

This process has many inherent disadvantages. For example, the scrap glass must be passed through a shredding operation and stored in a silo before blending with conventional granular batch. Further, the process demands that an entire glass furnace be kept at oxidizing conditions to ensure that carbonaceous material is removed.

DISCLOSURE OF INVENTION

The invention uses a modified ball mill in which a premixed batch of raw scrap cullet and particulate batch are charged. The material now can be milled together until the proper grind is achieved. I have found that the raw scrap will not ball mill well without the presence of the particulate batch. The particulate batch contains the fluffy scrap until it is ground. The ball mill may be charged by an injection screw which rotates with the mill. The screw can charge raw scrap or batch and may be assisted by a finger grinder.

The mill rotates near critical RPM using 1 inch alumina media until the material has the flowing properties of particulate batch. This batch then can be fed to a preheat system and the binders will be removed as the batch is preheated. The charger hopper is fed by a front end loader with a weighed charger or scrap and cullet while the batch can be conveyed by other means.

The invention feeds, grinds and proportions scrap cullet in particulate batch without handling and dusting difficulties. It then preheats and removes the binders and provides clean material for melting.

BRIEF DESCRIPTION OF THE DRAWING

The FIGURE illustrates the rotary drum heat exchanger, ball mill and feeder.

BEST MODE OF CARRYING OUT INVENTION

The method of this invention can be used to remove any coating from any glass fibers. It is only necessary that such coatings be capable of being converted to substances which can be burned off by the preheat media. Such coatings include sizes which are conventionally applied to glass fibers used in producing textiles, glass reinforcements products and the like. Such coatings also included binders which are conventionally applied to glass fibers used in producing insulation, ceiling panels, duct board, and the like.

The method of this invention is applicable to such materials regardless of the amount of such coatings on the surface of the fibers or of the nature of the glass fibers or glass fiber products.

Any conventional ball mill may be used to mill or grind the mixture of scrap glass and particulate glass batch. The scrap glass can be introduced into the mill in any suitable dimension. Preferably, the glass will be reduced in any suitable manner to a dimension which allows separation of the recovered glass from the particles of the bed. For example, scrap has been found satisfactory when reduced in dimension to discrete ¼" to 2" particles such as chunks, balls, cubes, strands and the like. While the method of this invention is described in terms of milling or grinding, I intend to include any processing that reduces the size of the scrap glass.

The method of this invention can be conducted at any suitable temperature to convert the coating on the glass to removable substances. Preferably, the drum will be maintained at a temperature within the range of from about 900° F. to about 1300° F. This temperature can be maintained by either heating the media or the drum by extraneous means, or both.

Referring now to the drawing which illustrates a preferred method of carrying out the invention, there is shown belt conveyor 2 which feeds scrap glass and particulate batch at a controlled rate to bin 4. The mixture is thoroughly mixed and accumulated in bin 4 and then fed to ball mill or dimension reducer 6 via screw 8 which rotates with mill 6. Screw 8 may charge raw scrap or particulate batch or both and may be assisted by a finger grinder not shown.

Mill 6 rotates near a desired RPM using 1 inch diameter alumina media until the material has the flowing properties of particulate batch. The mixture then is fed to preheat drum 10 from discharge valve 12 where the organics will be removed as the mixture is preheated. The invention feeds, grinds and proportions scrap cullet in particulate batch without handling and dusting difficulties. The process preheats and cleans off the organics and provides clean material for melting.

EXAMPLE

The scrap grinding drum has been trialed at 1000 lbs of batch and 400 lbs of high density scrap. The grinding time required is 10 min. for an excellent powder. The drum is four foot in diameter, five foot long, has a 12 inch input screw, and runs at an rpm which is determined at the time of processing. The discharge is through a 10 inch butterfly value. The drum contains 2000 lbs of one inch diameter alumina media.

INDUSTRIAL APPLICABILITY

Durable heat transfer media formed of glass batch agglomerates, glass, ceramic, steel, stainless steel, aluminum, gravel or the like may be used in this process. Alumina spheres and glass ceramic spheres have been found to be particularly useful. These materials have shown very good results as the heat transfer media for preheating glass batch. Their thermal and mechanical properties are good. The media may be used in the preheat drum or the ball mill.

The heated media is introduced into one end of a container such as a cylindrical drum rotatable on an inclined axis. Concurrently, the particulate material to be heated is introduced into the other end of the drum. The hot media flows in one general overall direction through the drum, and the particulate flows in a generally opposite direction through the drum. The media serves to heat the particulate, and the particulate serves to cool the media. The cooled media is recycled back to the preheat hopper and the preheated particulate may be fed to a furnace feed mechanism.

In the Figure, heat transfer media may be heated with flue gases at a temperature normally ranging from 482° to 677° C. from a glass melting furnace (not shown) in a preheat hopper (not shown). The media may be heated to a temperature at or near the temperature of the flue gases.

The hot media then is fed to one end of heat exchange drum 10 via conduit 14. Concurrently, the particulate glass batch raw materials and scrap glass are fed to the other end of the drum 10 via conduit 16. Drum 10 is rotated around the axis x—x by a motor and drive (not shown).

Centrally arranged stationary end parts at 20 and 22 form inlet and outlet conduits communicating with the inside of the drum. After the cooled media is discharged from the drum, via conduit 24, it may be returned to the preheat hopper. Hot mixed batch is discharged through screen 2b and fed to a glass melting furnace via stream 28.

The cylindrical container is inclined at an angle. In the preferred embodiment, the batch charging end of the container is elevated above the media charging end. While the angle can vary widely, generally the drum will form an acute angle with a horizontal line no greater than about 45° and typically less than 15°. Preferably, the angle is less than 5°.

In another embodiment, the media charging end of the container may be elevated above the batch charging end. The cold media then is discharged at the lower end of the container through means that allows the media to pass freely through but that prevents the batch from passing. The batch moves towards the upper end for discharge.

While the tumbling of the media and batch occurs through agitation from baffles if included and rotation of the drum, movement of the batch and media through the drum is believed to occur in the following manner. The media and batch form gradients in the drum and generally flow downhill in a direction along the gradients and in opposite directions. The batch and media tumble and move over each other as they flow from the high end to the low end of the pile of material in the container.

As the media move from left to right in the drum, less media is present in the drum. More batch mass is present at the right end of the drum than at the left end. While each axis is drawn in static form, the bath and media are intermixed and tumbling in the drum. At the left end of the drum batch typically is mixed with the media. At the right end of the drum, batch often covers the media.

In one embodiment of the invention, the scrap glass is milled in the presence of particulate sand, and the resulting milled mixture is mixed with particulate glass batch prior to being charged to the preheating drum.

I claim:

1. A process for producing glass by charging to a melting furnace and melting therein a mixture of particulate glass batch and scrap glass fiber, including the steps of:
   heating durable particulate heat transfer media which is larger in particle size than the glass bath with exhaust gases from the melting furnace;
   milling the scrap glass fibers in the presence of particulate glass batch to reduce the size of the scrap glass fibers to a usable size, the glass batch containing the scrap glass until it is milled;
   introducing the mixture into the other end of the container;
   rotating the container, during rotation the mixture and media tumbling and moving over each other in heat transfer relationship for a period of time sufficient to remove any organics from the scrap glass fibers; and
   moving the mixture in one direction through the rotating container for discharge and moving the media in the opposite direction for discharge at the other end.

2. A process according to claim 1 wherein the milling is carried out by ball milling.

3. A process according to claim 1 wherein the organics are removed by burning them off the scrap glass fibers.

4. A process according to claim 1 wherein the milling is carried out by hammarmilling or crushing.

5. A process according to claim 1 wherein the preheated, ground mixture is fed to a glass melting furnace.

6. A process according to claim 1 wherein the organics are sizes or binders conventionally applied to glass fibers.

7. A process according to claim 1 wherein the milling is carried out until the mixture has the flowing properties of particulate batch.

8. A process according to claim 1 wherein the milling is carried out by grinding.

* * * * *